(12) United States Patent
Lu et al.

(10) Patent No.: US 8,074,006 B2
(45) Date of Patent: Dec. 6, 2011

(54) ABNORMAL STATUS DETECTING METHOD OF INTERRUPT PINS

(75) Inventors: Ying-Chih Lu, Taipei (TW); Szu-Hsien Lee, Taipei (TW)

(73) Assignee: Inventec Corporation, Taipei (TW)

( * ) Notice: Subject to any disclaimer, the term of this patent is extended or adjusted under 35 U.S.C. 154(b) by 267 days.

(21) Appl. No.: 12/614,655

(22) Filed: Nov. 9, 2009

(65) Prior Publication Data

US 2011/0072181 A1    Mar. 24, 2011

(30) Foreign Application Priority Data

Sep. 22, 2009    (TW) ............................... 98131997 A

(51) Int. Cl.
*G06F 13/24*    (2006.01)

(52) U.S. Cl. ........................................ 710/266; 714/5.1

(58) Field of Classification Search .......... 710/260–267; 714/3, 4.2, 5.1–5.11
See application file for complete search history.

(56) References Cited

U.S. PATENT DOCUMENTS

| | | | |
|---|---|---|---|
| 5,555,420 A * | 9/1996 | Sarangdhar et al. | 710/266 |
| 7,562,173 B2 * | 7/2009 | De et al. | 710/267 |
| 2005/0022059 A1 * | 1/2005 | Wei | 714/36 |

* cited by examiner

*Primary Examiner* — Clifford Knoll
(74) *Attorney, Agent, or Firm* — J.C. Patents

(57) ABSTRACT

An abnormal status detecting method of interrupt pins is provided. In the invention, an advanced configuration and power interface (ACPI) table is looked up for obtaining an interrupt status bit of each interrupt pin in a computer system. Afterwards, the interrupt status bit is continuously checked whether it is maintained at a specific value during a fixed time. When the interrupt status bit of one of the interrupt pins is maintained at the specific value during the fixed time, the interrupt pin is determined to be abnormal.

10 Claims, 5 Drawing Sheets

```
Scope(\_SB){
    Name(AR00, Package(){
        Package(){0x001DFFFF, 0, 0, 16 },
        Package(){0x001DFFFF, 1, 0, 19 },
        Package(){0x001DFFFF, 2, 0, 18 },
        Package(){0x001DFFFF, 3, 0, 23 },
    })

Name(AR08, Package(){
        Package(){0x0005FFFF, 0, 0, 26 },
        Package(){0x0005FFFF, 1, 0, 25 },
    })

Device(PCI0){
        Name(_HID, EISAID("PNP0A03"))
        Name(_ADR, 0x00000000)
        Name(_BBN, 0x0000)
        Method(_PRT,0){
          Return(AR00)
        }
        Device(EPA0)
        {
          Name(_ADR, 0x00020000)
          Method(_PRT,0){
            Return (AR08)
          }
        }
    }
}
```

FIG. 4A

```
Device(TMR) {
    Name(_HID,EISAID("PNP0100"))
    Name(_CRS, ResourceTemplate()
    {
        IO(Decode16, 0x40, 0x40, 0, 0x4)
        IRQNoFlags(){0}
    })
}    // End of TMR
```

FIG. 4B

ABNORMAL STATUS DETECTING METHOD OF INTERRUPT PINS

CROSS-REFERENCE TO RELATED APPLICATION

This application claims the priority benefit of Taiwan application serial no. 98131997, filed on Sep. 22, 2009. The entirety of the above-mentioned patent application is hereby incorporated by reference herein and made a part of specification.

BACKGROUND OF THE INVENTION

1. Field of the Invention

The invention generally relates to an abnormal status detecting method of a computer system, and more particularly, to an abnormal status detecting method of interrupt pins.

2. Description of Related Art

Generally, in an operating system, although the center processing unit (CPU) does not process any software, it may still be busy, such as a situation in which the CPU usage rate is always about 100%. In such a case, users require postulating why the CPU is busy based on experience.

For example, after drivers are all removed, the users observe whether the CPU usage rate returns to a normal condition. If the CPU usage rate returns to the normal condition, the users can further find which driver causes the CPU to be busy. Alternatively, after the devices are all disabled, if the CPU usage rate returns to the normal condition, the users further find which device causes the result. Moreover, if the devices can not be disabled, interrupt signals may be restrained from being sent out by using the interrupt enable bit or the bus master bit of the peripheral component interface (PCI) configuration space.

However, in the conventional method, which one causes the CPU usage rate to be abnormal is postulated based on appearance. Accordingly, it is ineffective, and if the device has no driver or the driver can not be disabled, whether the issues are caused by the device can not be verified. Moreover, if the interrupt signals are continuously sent out due to the wrong connection between hardware, the issues can not be found in the conventional method.

SUMMARY OF THE INVENTION

An embodiment of the invention provides an abnormal status detecting method of interrupt pins to detect the abnormal interrupt pins.

Specifically, the embodiment of the invention provides the abnormal status detecting method of the interrupt pins adapted for a computer system. The abnormal status detecting method includes following steps. An advanced configuration and power interface (ACPI) table is looked up to obtain an interrupt status bit of each of the interrupt pins in the computer system. Next, whether each of the interrupt status bits is maintained at a specific value is continuously checked during a fixed time. When the interrupt status bit of one of the interrupt pins is maintained at the specific value during the fixed time, it is determined that the interrupt pin is abnormal.

In an embodiment of the invention, before the step of looking up the ACPI table, whether a center processing unit (CPU) usage rate reaches a threshold is further determined to look up the ACPI table when the CPU usage rate reaches the threshold.

In an embodiment of the invention, in the step of looking up the ACPI table, a register address of each of the interrupt pins is looked up to obtain the interrupt status bit of the corresponding interrupt pin according to the register address. Moreover, a local pin number of each of the interrupt pins is further obtained according to the ACPI table.

In an embodiment of the invention, after the step of determining that the interrupt pin is abnormal, the local pin number of the abnormal interrupt pin is converted to a global pin number. Next, according to the global pin number, a device name corresponding to the abnormal interrupt pin is obtained. Thereafter, the device name, the local pin number, and a corresponding input/output advanced programmable interrupt controller identification number (IOAPIC ID number) of the interrupt pin are recorded. Moreover, after the step of determining that the interrupt pin is abnormal, an abnormal message is displayed.

In an embodiment of the invention, the device name is further obtained through a driver corresponding to the abnormal interrupt pin.

In an embodiment of the invention, the abnormal status detecting method further includes a step of disabling the abnormal interrupt pin.

In an embodiment of the invention, the ACPI table comprises a multiple APIC description table (MADT), a differentiated system description table (DSDT), and a fixed ACPI description table (FADT).

In view of the above, in an embodiment of the invention, the abnormal interrupt pins and the device names of the devices which use the abnormal interrupt pins are listed through detecting the abnormal status of the interrupt pins. Accordingly, the abnormal interrupt pins are disabled, so that the CPU usage rate returns to the normal condition. Moreover, designers can find issues due to the abnormal status and further solve them through measuring the path including the abnormal interrupt pin.

To make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B illustrates parts of ASL code according to an embodiment consistent with the invention.

DESCRIPTION OF EMBODIMENTS

In an operating system, when the CPU does not process any software but the CPU usage rate is almost 100%, users require postulating why the CPU is busy based on experience. Accordingly, an embodiment of the invention provides an abnormal status detecting method of interrupt pins. By detecting whether the interrupt pins are in the abnormal status, the abnormal interrupt pins and the device names of the devices which use the abnormal interrupt pins are listed. In order to make the invention more comprehensible, embodiments are described below as the examples to prove that the invention can actually be realized.

For convenience, in following embodiments, the abnormal status detecting method of interrupt pins is executed by installing the application software in the storage unit of a computer system, for example. The application software may be programmed in a program language, such as C language or Java language, to finish the abnormal status detecting method of interrupt pins through electronic automation. However, it can not limit the applicable scope of the invention.

Figure 1:
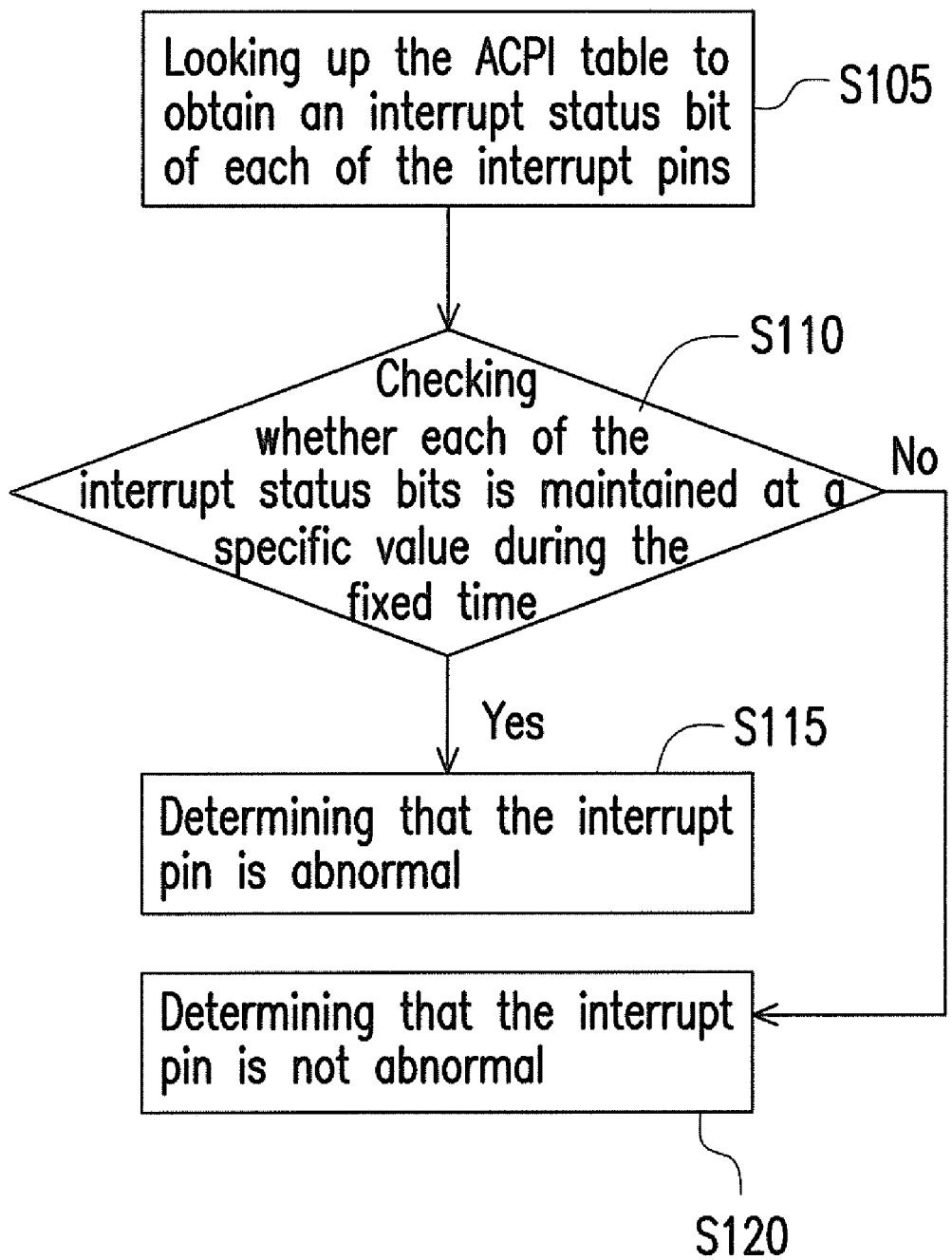
FIG. 1 is a flowchart of an abnormal status detecting method of interrupt pins according to an embodiment consistent with the invention.

FIG. 1 is a flowchart of an abnormal status detecting method of interrupt pins according to an embodiment consistent with the invention. The abnormal status detecting method of the present embodiment is used to detect whether the interrupt pins of a computer system are in an abnormal status. In the present embodiment, the operating system of the computer system operates in an advanced programmable interrupt controller (APIC) mode. Herein, inside the CPU of the computer system, a local APIC unit is disposed. Moreover, the computer system further has an I/O APIC unit for processing interrupt signals issued by I/O devices through the I/O APIC unit. The local APIC unit and the I/O APIC unit respectively have identification numbers thereof. For example, if the computer system has two local APIC units and two I/O APIC units, the identification numbers thereof respectively are 0-3.

Referring to FIG. 1, first of all, in step S105, an ACPI table is looked up to obtain an interrupt status bit of each of the interrupt pins in the computer system. In the present embodiment, the ACPI table comprises a multiple APIC description table (MADT), a differentiated system description table (DSDT), and a fixed ACPI description table (FADT).

Herein, the MADT includes a memory-mapped I/O (MMIO) address of each I/O APIC unit and the identification number of each I/O APIC unit. The FADT includes global pin numbers of system control interrupt (SCI) signals. The DSDT includes device names corresponding to each interrupt pin.

Herein, the MMIO address of each I/O APIC unit in the computer system is obtained by looking up the MADT, and further, the local pin numbers and the interrupt status bits of all the interrupt pins of each APIC unit are respectively obtained through the MMIO. Herein, each of the interrupt pins has a corresponding register address to store the interrupt status bit. For example, when the interrupt status bit is 0, it means that the interrupt pin is in an inactive status at present; when the interrupt status bit is 1, it means that the interrupt pin is in an active pending status at present.

It should be noted that, when any software is not processed, but the CPU is busy, the abnormal status detecting method of interrupt pins starts to be executed in the present embodiment. For example, when any software is not processed, whether the CPU usage rate reaches to a threshold is determined. The threshold, for example, is 90% or about 100%, and it can be set by users. If the operating system does not process any software, but the CPU usage rate has reached to the above threshold, it means that the abnormality may appear at present. Accordingly, the abnormal status detecting method of interrupt pins starts to be executed in the present embodiment to find the abnormal interrupt pins.

Next, after the interrupt status bit of each interrupt pin is obtained, as shown in step S110, during a fixed time, whether each of the interrupt status bits is maintained at a specific value is continuously checked to accordingly determine whether the corresponding interrupt pin is in the abnormal status. That is, whether each of the interrupt pins is in the abnormal status is checked in sequence.

When the interrupt status bit is maintained at the specific value during the fixed time, as shown in step S115, it is determined that the interrupt pin corresponding to the interrupt status bit is abnormal. On the contrary, when the interrupt status bit changes during the fixed time (e.g. the interrupt status bit is cleared), as shown in S120, it is determined that the interrupt pin corresponding to the interrupt status bit is not abnormal.

Generally, if the interrupt pin transmits the interrupt signal and triggers the CPU, the driver corresponding to the device of the interrupt signal starts to be executed to serve the interrupt signal. In a reasonable condition, after a period of fixed time, it means that the interrupt signal has been served, and the interrupt status bit will be cleared. Accordingly, if the interrupt status bit is always maintained under the specific value, such as 1, during the fixed time, it is an unreasonable condition. In such a case, it may be that the interrupt signal issued by the corresponding device is unreasonable, or that the interrupt pin continuously issues the interrupt signal due to the wrong connection between hardware.

For example, the above fixed time is set as 0.5 second. When the interrupt status bit is 1 all the time during 0.5 second, it means that the interrupt signal of the interrupt pin can not be served. Accordingly, it is determined that the interrupt pin is abnormal.

Figure 2:
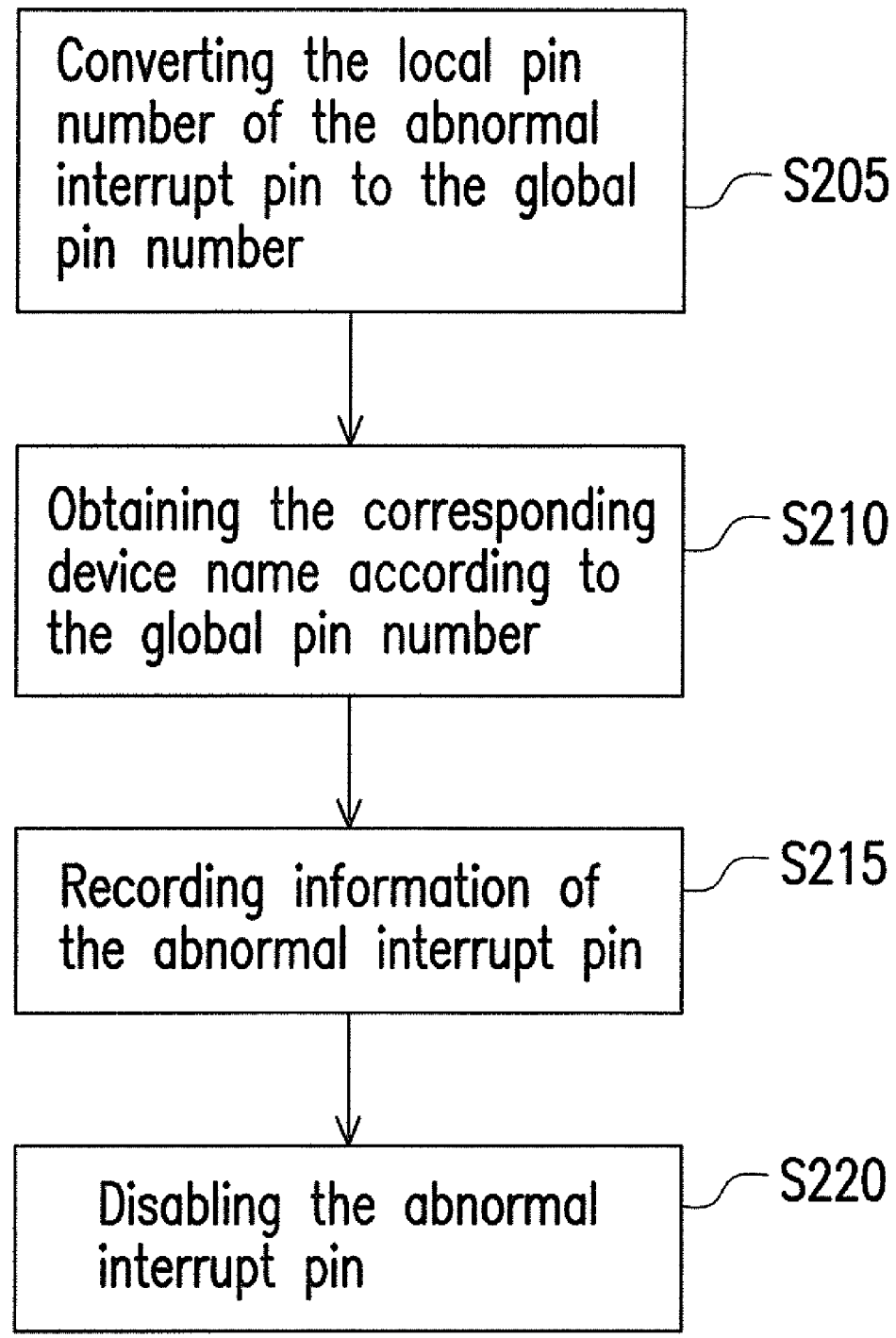
FIG. 2 is a flowchart of an abnormal interrupt pin recording method according to an embodiment consistent with the invention.

Another embodiment consistent with the invention is described as follows to illustrate the process after it is determined that the interrupt pin is abnormal. FIG. 2 is a flowchart of an abnormal interrupt pin recording method according to an embodiment consistent with the invention. Referring to FIG. 2, as shown in step S205, after the abnormal interrupt pin has been checked, a local pin number of the abnormal interrupt pin is converted to a global pin number. Because the global pin number is used for the interrupt routing table described by DSDT ASL code of ACPI, the local pin number is converted to the global pin number for convenience.

Figure 3:
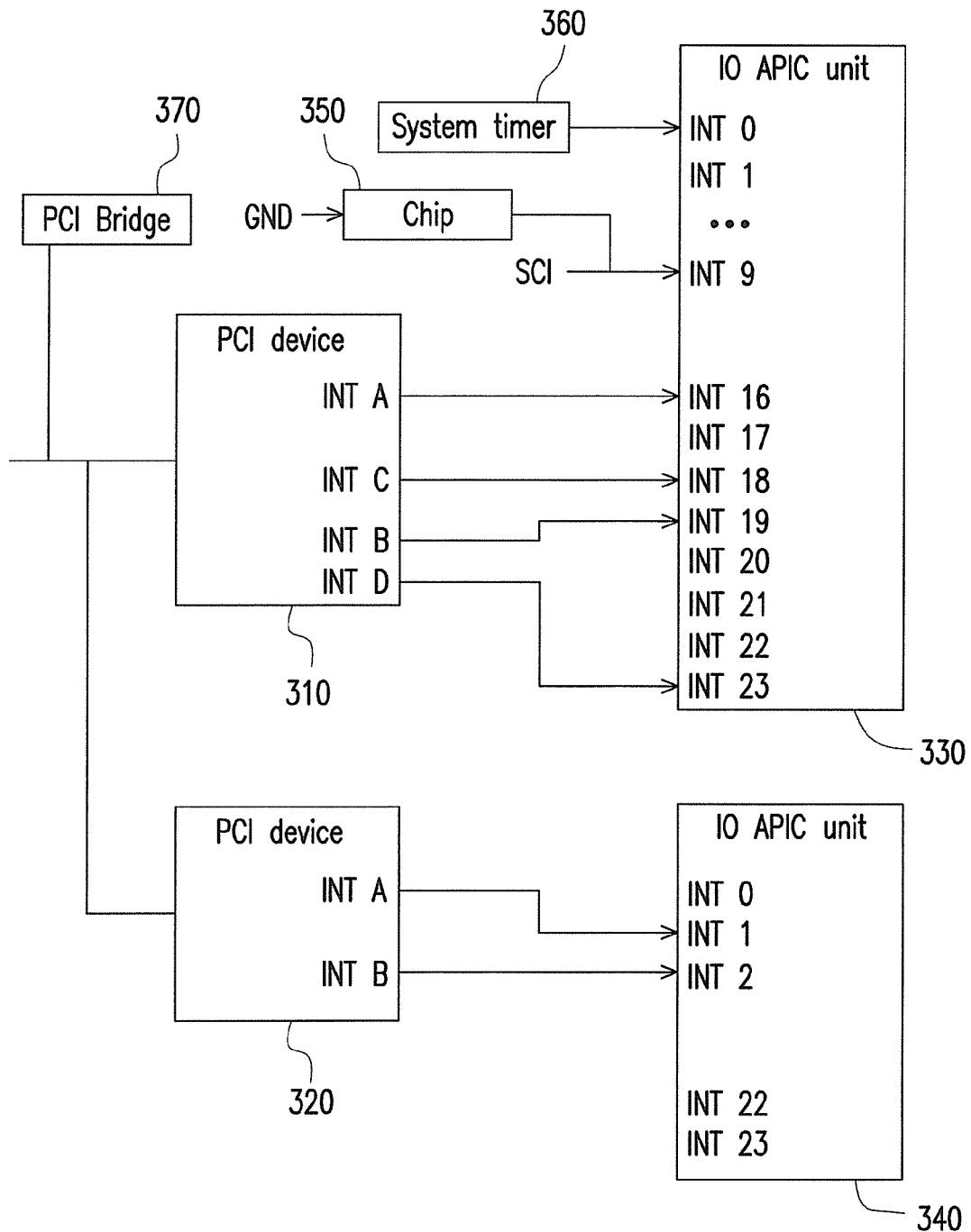
FIG. 3 is a schematic view of a computer system according to an embodiment consistent with the invention.

For example, FIG. 3 is a schematic view of a computer system according to an embodiment consistent with the invention. In the present embodiment, peripheral component interface (PCI) devices 310 and 320 are respectively connected to I/O APIC units 330 and 340. PCI device 310 and 320 are respectively connected to PCI bridge 370. Chipset 350 and system timer 360 are connected I/O APIC unit. Herein, the identification (id) numbers of the I/O APIC units 330 and 340 are respectively 2 and 3. The global pin number of each interrupt pin of the I/O APIC unit 330 having the id number of 2 is equal to the local pin number thereof; the global pin number of each interrupt pin of the I/O APIC unit 340 having the id number of 3 is equal to the local pin number thereof added with the pin number of the I/O APIC unit having the id number of 2, as shown in the below table.

| I/O APIC unit 330 | | | | | | |
|---|---|---|---|---|---|---|
| local pin number | 0 | 1 | 2 | ... | 22 | 23 |
| global pin number | 0 | 1 | 2 | ... | 22 | 23 |
| I/O APIC unit 340 | | | | | | |
| local pin number | 0 | 1 | 2 | ... | 22 | 23 |
| global pin number | 24 | 25 | 26 | ... | 46 | 47 |

Thereafter, in step S210, the corresponding device name is obtained according to the global pin number. For example, the DSDT is looked up to obtain the device name corresponding to the abnormal interrupt pin according to the global pin number. The DSDT is designed according to ACPI source language (ASL) code. Through the DSDT, it is known that which device the used interrupt pin corresponds to at present.

It should be noted that, if the device is a non-plug and play (non-PnP) device, such as a system timer, the corresponding device name is obtained through the hardware identification (HID) thereof. Moreover, if the device is a PnP device, such as a PCI device, the corresponding device name thereof can be obtained through the device id code in the PCI configuration space thereof or the vendor id code. Furthermore, if these devices have corresponding drivers, the device names are exactly obtained through the drivers.

For example, FIG. 4A and FIG. 4B illustrates parts of ASL code according to an embodiment consistent with the invention. Herein, FIG. 4A shows the ASL code related to the interrupt pins of the PCI devices 310 and 320, and FIG. 4B shows the ASL code related to the system timer 360.

In FIG. 4A, for the global pin number 26, i.e. the interrupt pin 2 of the I/O APIC unit 340, it corresponds to the code "Package( ){0x0005FFFF, 0, 0, 26}" in the DSDT, wherein "0x0005" is a PCI device number. Accordingly, through the PCI bus number and the PCI device number, the device id code in the PCI configuration space thereof or the vendor id code can be obtained, and further, through the vendor id code and the device id code, the vendor and the device name of the PCI device 320 are obtained.

In FIG. 4B, "IRQNoFlags( ){0}" represents the global pin number 0. That is, the local pin number 0 of the I/O APIC unit 330. Herein, "Name(_HID,EISAID("PNP0100"))" records as the HID as "PNP0100". Accordingly, the device name of the system 360 is obtained through the standard HID.

Moreover, it is should be noted that, the global pin number of the SCI signal can be obtained further through looking up the FADT. Accordingly, it is known that whether the abnormal status is caused by the SCI signal. In other words, when the abnormality occurring in the interrupt pin INT9 of the I/O APIC unit 330 is checked, through looking up the FADT, it is known that the interrupt pin INT9 is used to receive the SCI signal. Accordingly, it is determined that the system is abnormal due to the SCI signal.

Next, referring to FIG. 2, in step S215, information of the abnormal interrupt pin, such as the device name, the local pin number, and the id number of the I/O APIC unit, is recorded for reference while the users maintain the system. Moreover, an abnormal signal may further be displayed to alarm the users that the abnormality occurs in the system at present.

Finally, in step S220, the abnormal interrupt pin is disabled. For example, each of the corresponding register address of the interrupt pin includes a mask bit. Herein, when the mask bit is 0, it means that the interrupt signal triggered by the interrupt pin can be transmitted out to trigger CPU; when the mask bit is 1, it means that the interrupt pin is disabled, so as not to transmit any interrupt signal. Accordingly, after the abnormal interrupt pin is detected, the mask bit may be set as 1 to disable the interrupt pin. As a result, the system can be recovered and operate normally.

To sum up, in the embodiment of the invention, the abnormal interrupt pins and the device names of the devices which use the abnormal interrupt pins are listed through detecting the abnormal status of the interrupt pins. Accordingly, the abnormal interrupt pins can quickly be found then disable the abnormal interrupt pins, so that the CPU usage rate returns to the normal condition. Moreover, designers can find issues due to the abnormal status and further solve them through measuring the paths-between the abnormal interrupt pins and IOAPIC units.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. An abnormal status detecting method of interrupt pins, adapted for a computer system, the abnormal status detecting method comprising:
   looking up an advanced configuration and power interface (ACPI) table to obtain an interrupt status bit of each of the interrupt pins in the computer system;
   continuously checking whether each of the interrupt status bits is maintained at a specific value during a fixed time; and
   determining that one of the interrupt pins is abnormal when the interrupt status bit of the interrupt pin is maintained at the specific value during the fixed time.

2. The abnormal status detecting method as claimed in claim 1, before the step of looking up the ACPI table, the abnormal status detecting method further comprising:
   determining whether a center processing unit (CPU) usage rate reaches a threshold to look up the ACPI table when the CPU usage rate reaches the threshold.

3. The abnormal status detecting method as claimed in claim 1, wherein the step of looking up the ACPI table comprises:
   looking up a register address of each of the interrupt pins to obtain the interrupt status bit of the corresponding interrupt pin according to the register address.

4. The abnormal status detecting method as claimed in claim 1, wherein the step of looking up the ACPI table further comprises:
   obtaining a local pin number of each of the interrupt pins.

5. The abnormal status detecting method as claimed in claim 4, after the step of determining that the interrupt pin is abnormal, the abnormal status detecting method further comprising:
   converting the local pin number of the abnormal interrupt pin to a global pin number; and
   obtaining a device name corresponding to the abnormal interrupt pin according to the global pin number.

6. The abnormal status detecting method as claimed in claim 5, wherein the step of obtaining the device name corresponding to the abnormal interrupt pin according to the global pin number comprises:
   obtaining the device name through a driver corresponding to the abnormal interrupt pin.

7. The abnormal status detecting method as claimed in claim 5, after the step of determining that the interrupt pin is abnormal, the abnormal status detecting method further comprising:
   recording the device name, the local pin number, and a corresponding input/output advanced programmable interrupt controller identification number (IOAPIC ID number) of the interrupt pin.

8. The abnormal status detecting method as claimed in claim 1, after the step of determining that the interrupt pin is abnormal, the abnormal status detecting method further comprising:
   displaying an abnormal message.

9. The abnormal status detecting method as claimed in claim 1, further comprising:
   disabling the abnormal interrupt pin.

10. The abnormal status detecting method as claimed in claim 1, wherein the ACPI table comprises a multiple APIC description table (MADT), a differentiated system description table (DSDT), and a fixed ACPI description table (FADT).

* * * * *